March 11, 1930.     C. C. WORTHINGTON     1,750,145
CLEATED GROUND WHEEL
Filed Jan. 25, 1926
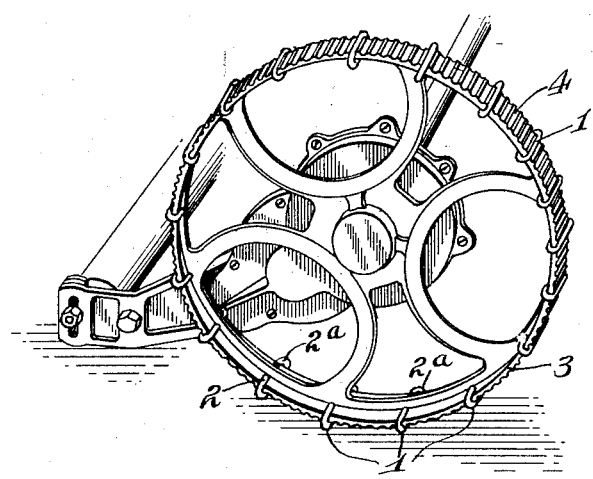
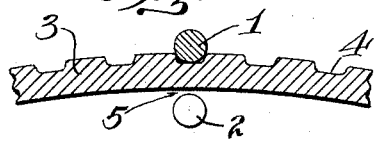
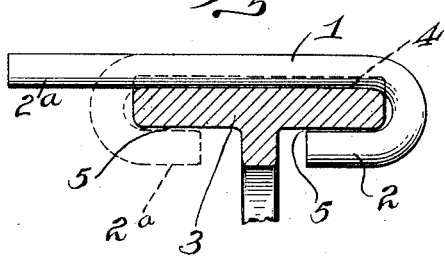
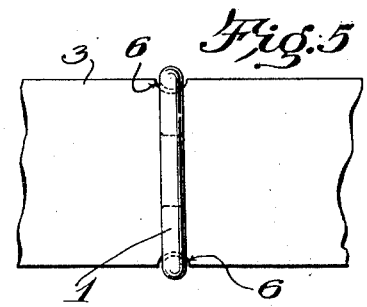
Charles C. Worthington
INVENTOR
BY Jeffery Kimball & Eggleston
ATTORNEY Patented Mar. 11, 1930

1,750,145

UNITED STATES PATENT OFFICE

CHARLES C. WORTHINGTON, OF DUNFIELD, NEW JERSEY

CLEATED GROUND WHEEL

Application filed January 25, 1926. Serial No. 83,585.

The invention relates to cleats for the ground or driving wheels of lawn mowers and the like. It is customary to provide such wheels as these with corrugated rim surfaces to assist the wheel in gripping the ground to provide the necessary drive for the cutter reel but even with the wheel rims so formed, it has been found that the wheels will skid when the rotation of the cutter is resisted to any great extent, as by particularly tough grass, or for any other reason and moreover this skidding and consequent failure of the cutter reel to operate becomes even more pronounced when the tread surface becomes at all worn or clogged with dirt.

It is an object of the present invention therefore, to provide a simple and inexpensive cleat of such construction that it may be readily applied to wheels of this kind and one which will insure a steady drive for the cutter reel at all times.

It is a further object of the invention to provide a ground wheel cleat, which is, in effect, self-cleaning.

Referring to the drawings:

Fig. 1 is a perspective view of a lawn mower wheel having the present invention applied thereto.

Fig. 2 is a section of a portion of a ground wheel showing the position of the mounted cleat relatively to the rim.

Fig. 3 is a section of the wheel rim showing the method of applying the ground wheel cleat.

Fig. 4 is a perspective view of the cleat ready for attaching to a wheel rim; and Fig. 5 is a modification.

In its preferred form the cleat comprises a length of stout wire initially bent to a hook-shape as shown in Fig. 4, and having arms 1 and 2 of unequal length. As shown in Fig. 3, the cleat is applied to the rim 3 of the wheel by sliding it axially thereover, placing the long arm in one of the flats or transverse grooves 4 of the corrugated cast iron wheel tread. The free end of this arm is then hammered or bent radially over and around the rim edge to form a portion 2ª similar to the short arm 2. With the cleats so secured, a projecting tread portion is provided which extends radially beyond the cast iron tread surface a sufficient distance to cause the wheel to grip the lawn under all circumstances.

Preferably the arms 2 and 2ª are not bent into close contact with the inner face of the rim 3, but only enough to keep the body of the cleat in the groove 4 and thus prevent circumferential displacement. This leaves the cleat capable of limited local movement relatively to the rim 3, the clearance being indicated by the reference numeral 5, and the advantage of this arrangement is that the cleats will slightly change their positions relative to the wheel as the latter rotates and thus dislodge dirt and matted grass which they might otherwise retain and which if not removed might result in the slipping of the wheel on the lawn.

Any desired number of cleats may of course be spaced around the wheel rim, and for an 18 inch wheel it has been found satisfactory to attach a cleat on about every fifth or sixth flat or groove. Preferably the cleats are formed of 3/16 inch round steel wire or cold rolled rod pliable enough to be affixed in the manner described, although it will be understood that the shape and material of the cleats are subject to selection according to the conditions in hand.

The three-sixteenth inch wire gives adequate traction for a thirty-inch motor-drawn mower, but greater traction is available within the invention by employing larger diameters or specially designed cross sections for the body part of the cleat, according to circumstances. Wheels with flats 4 wider than shown will obviously allow greater self-cleaning movement for the cleats. When cleats applied in the manner described become worn down and no longer efficient, they can be very easily removed and replaced by new ones thus always maintaining a good traction grip on the lawn. With the cleats applied at sufficiently close intervals the original corrugations of the tread surface are not subjected to slippage wear and the effective life of the wheel is thereby lengthened. So far as the corrugations serve for holding the cleats in position on the rim it will be obvious that their position on the tread surface is not important and that equivalent grooves, notches or shoulders or walls of any kind which are substantially radial in direction can be located elsewhere on the rim or wheel for the same purpose; in Fig. 5 the side notches 6 serve to provide such walls and retain the cleat in place regardless of the contour of the tread surface, and the width of these notches permits the self-cleaning movement above described.

Having now described my invention, what I claim is:

1. In combination with a lawn-mower ground wheel having a corrugated rim, a plurality of individual traction cleats spaced around the periphery thereof and each comprising a body portion adapted to cooperate with the rim corrugations and having inwardly displaced end portions integral therewith and adapted to hold the cleat on the rim.

2. In combination with a lawn-mower ground wheel having a corrugated rim, a plurality of individual traction cleats spaced around the periphery thereof and each comprising a body portion adapted to cooperate with the rim corrugations and having inwardly displaced end portions integral therewith and adapted to hold the cleat loosely on the rim to permit local movement of the cleat relatively to the rim, limited by said corrugations.

3. A ground wheel for lawn mowers and the like furnished with a series of independent cleat members circumferentially spaced each from the other along the outer face of the rim of said wheel, each of said members having bent over portions loosely engaging the edges of said rim whereby the members are held upon said rim, said wheel having parts with radially directed walls directly coacting with said members for retaining them, independently of each other, in their said spaced positions and permitting limited relative movement between said members and said rim.

In testimony whereof, I have signed this specification.

CHARLES C. WORTHINGTON.